2 Sheets-Sheet 1.
M. Trapp, Jr.
Dressing Stares.
No. 1948. Reissued May 2, 1865.
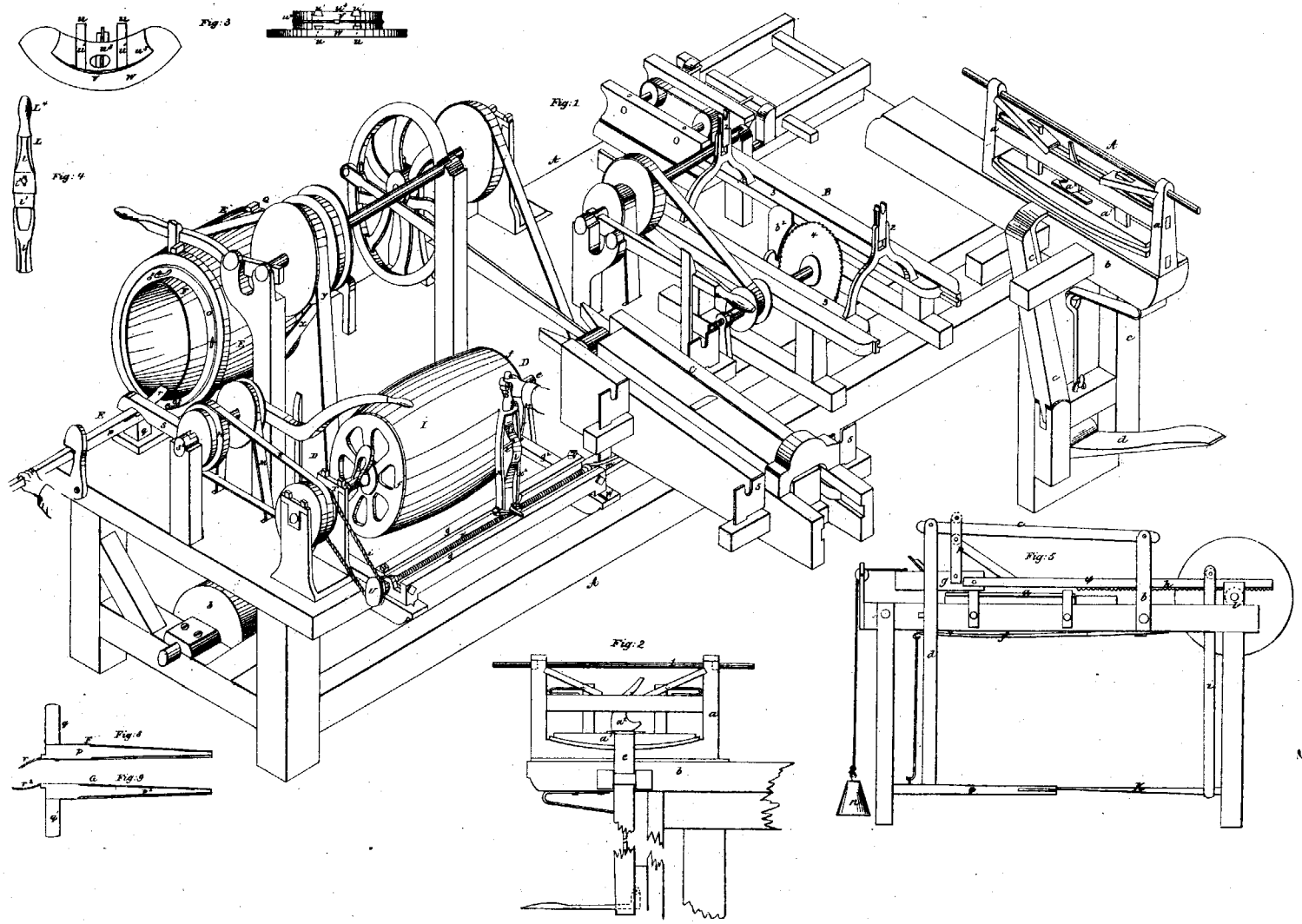
AM. PHOTO-LITHO. CO. N.Y. (OSBORNE'S PROCESS.)

2 Sheets-Sheet 2.
W. Trapp, Jr.
Dressing Staves.
No. 1946. Reissued May 2, 1865.
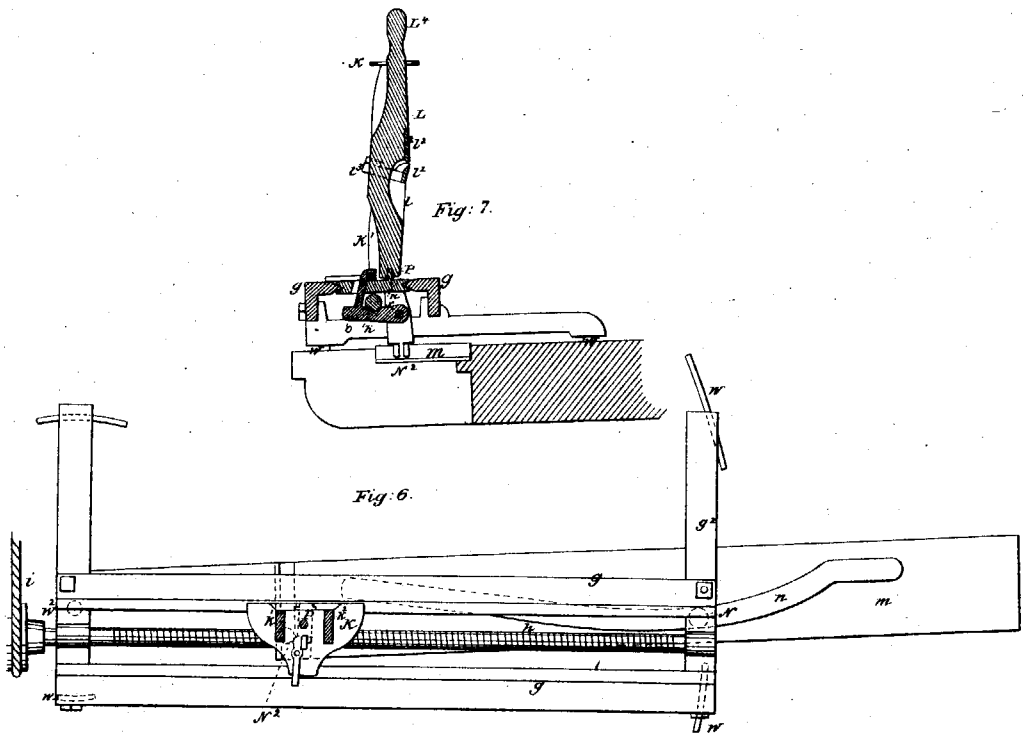
AM. PHOTO-LITHO. CO. N.Y. (OSBORNE'S PROCESS.)

UNITED STATES PATENT OFFICE.

WILLIAM TRAPP, JR., OF ELMIRA, NEW YORK.

IMPROVEMENT IN BARREL-MACHINERY.

Specification forming part of Letters Patent No. 4,218, dated October 1, 1845; Reissue No. 132, dated March 10, 1849; extended seven years; Reissue No. 1,946, dated May 2, 1865.

DIVISION NO. 1.

*To all whom it may concern:*

Be it known that I, WILLIAM TRAPP, Jr., late of Dryden, New York, but now of Elmira, in the county of Chemung and State of New York, have invented new and useful Improvements in the Manufacture of Barrels, as well as of other bilge-work; and I do hereby declare that the following is a full, clear, and exact description thereof, which will be more fully understood by reference to the drawings, in which—

Figure 1 represents an isometrical view of the machinery employed. Fig. 2 is the concave bed employed for bilging the staves. Fig. 3 is a front and edge view of the crozing-tool, stock, and changeable face-plate. Fig. 4 is a front or face view of the tool for turning off the outside of the cask. Fig. 6 is a horizontal section of a slide-rest for supporting and moving the turning-tool aforesaid so as to conform to the bilge of the cask. Fig. 7 is a vertical cross-section of the same. Fig. 8 is a side view of the chamfering-tool inverted. Fig. 9 is a side view of the doweling-tool.

The staves, having been shaped and prepared as hereinafter described, are set up in the form of a barrel or other bilge-work and placed between two circular metallic heads, *f f*, attached to a mandrel, *e*, and secured to said heads by points projecting therefrom entering the ends of the staves, or are secured in place by a shallow flange turned on said heads and fitting tightly around the ends of the staves. The mandrel is then placed in its bearings and revolved in any convenient way. In front of the cask thus prepared are arranged two parallel bars, *g g*, Figs. 1, 6, and 7, that serve as ways for a sliding rest, *k*, being firmly joined together at each end and bolted to the frame at one end by a single bolt, $W^2$, Fig. 6, on which they move or slide, and resting on ways or rails W. Between these bars is arranged a screw, *h*, resting in boxes secured to the pieces connecting the extremities of the bars *g g* together, and turned by a band, *i*, leading from a pulley, T, on the mandrel *e*, to a pulley, U, on the end of the screw *h*. The slide-rest *k* is placed between these bars *g g*, resting on the edges of the same, which is moved past the barrel over said bars by means of a divided nut, X, Fig. 7, resting on the screw *h*, and arranged so as to be detached therefrom at the will of the operator. Upon the slide-rest are erected two vertical standards, $k'$ $k^2$, with a cap-piece, K, at the top, having an oblong opening formed on it for the insertion of a tool or stock, L, between the said standards, the handle $L^4$ of said tool extending up through the said opening in the cap K for the operator to lay hold of, and the lower end having an opening in it into which is inserted a pin, P, projecting from the upper surface of the slide-rest *k*, upon which the tool rests and turns. This tool has its inner face represented at $l$ $l'$ $l^2$, Figs. 4 and 7, in which is inserted a cutter, $l'$, the face of which extends nearly the full distance across the face of the stock at right angles to the shank $l^3$, Fig. 7, which shanks are inclined upward and fitted into recesses in the sides of the stock and keyed fast by wedge-keys for holding the tool or cutter firmly in its proper position. Immediately above the cutter there is a gage or movable face-plate, $l^2$, that is kept close to the edge of the cutter $l'$, so as to form the throat of the tool and gage the thickness of the shaving to be taken off. The continuous shaving taken off by the said cutter is of the form of a parallelogram in its cross-section about one-third of its width—the middle third being in the form of a thin wedge and the remaining third being prevented from touching the barrel, or, in other words, the cutter, as it moves along from one end of the barrel to the other while the barrel revolves is made to take a rank cut at the forward corner and a thin feather-edged cut in the middle and perform no cutting on the rear corner—thus causing the outer surface of the barrel to be left perfectly smooth. This form of chip or shaving taken from the surface of the barrel by the aforesaid straight-edged cutter is produced by the peculiar form of the face of the face-plate, which is filed away to a uniform depth one-third its width, as at $l^5$, Fig. 4, to produce the rank cut, the middle third being filed away in a sloping manner to produce the tapered portion of the shaving, as at $l^4$, Fig. 4. The pin P, on which the tool-stock L rests, holds the lower end of the stock in the required position and allows the upper part, $L^4$, to turn and move toward or from the barrel, being guided by the slit in the cap K. By this means the tool can be guided and humored to the inequalities of the barrel when it is not properly arranged in relation to the center between the heads of the mandrel, thus cutting the staves to one uniform thickness.

To move the slide-rest *k* out as it approaches the bilge of the barrel I attach a pattern, *m*, thereto, having a curved slit, *n*, therein, into which a pin, N, (represented by dotted lines in Fig. 6,) on the under side of the right-hand cross-bar, $g^2$, enters, and as this pattern *m* slides along with the rest *k* the ends of the ways *g* next the pattern *m* is carried out and in, following the work, its movements corresponding with the bilge of the barrel. This pin N has an anti-friction-roller on it for reducing the friction between the rubbing-surfaces of the slit *n*. There is a similar pin, $N^2$, on the under side of the rest *k*, on which there is also an anti-friction-roller traveling along the curved slit *n* of the pattern *m* for guiding the tool, as represented at $N^2$, Fig. 7, and by dotted lines in Fig. 6. Curved ways corresponding to the curve or bilge of the barrel are sometimes used for the slide-rests and tool to slide upon in dressing off the outside of the barrel.

After the barrel I (as set up) has been turned off on the outside, as described, it is transferred to a hollow cylinder, E, turning in collars Q, attached to the bench—one at each end of the barrel—and is secured firmly therein by two ring-chucks, O, made to fit the taper of the barrel, and inserted in the ends of the cylinder E between it and the cask I′—one of said ring-chucks, being fixed stationary at one end of the cylinder and the other formed to slide in and out between the cylinder and barrel. The barrel is placed in the cylinder E with its ends projecting beyond it, and the ring-chucks O are forced between it and the inner periphery of the cylinder, holding it firmly in its position. It is then put in motion by drum-bands and pulleys or by any other convenient means.

The ring-chuck O in Fig. 1, above-named, is divided on one side, and has two staples, $O^2$, driven into its end on opposite sides for drawing it out when required. By being thus divided it can be driven in tight and made to bind equally on the cylinder and barrel. The barrel may be used instead of the cylinder, and for it, by fitting the ring-chucks to revolve within the collars Q Q. The tools for howeling and chamfering are then applied. These tools are shown at F and G. The one for chamfering consists of a straight bar, *p*, having a foot or rest, *q*, projecting from it at right angles at one end, at which end the cutter *r* is affixed. This tool is applied as represented at F, Fig. 1, the knife being in contact with the chime of the barrel and the foot *q* resting on the bench, serving to hold the tool in a firm position during the operation, and being prevented from moving laterally by a hook, *s*, fastened to a standard in the bench and brought down over the inner end. The outer end of the bar *p* is gradually raised during the operation, causing the knife to lower and cut the chime till said outer end of the bar *p* comes in contact with a projection formed on a hinged gage-bar, *t*, attached to the bench, which regulates the depth of the cut. The blade is shaped so as to form a curved cutter, with a straight shank inserted into the handle *p*, and there secured by screws or other proper fastenings. Both edges are made sharp, so as to work at both ends of the barrel, and are above the upper surface of the handle, as represented in Figs. 1 and 8. In Fig. 8 the tool is represented in an inverted position.

The tool for howeling also consists of a straight bar, $p^2$, Fig. 9, serving as its handle, and a projection or foot, $q^2$, Fig. 9, serving as a rest or support for the tool during the operation of howeling, being made in a similar manner to those of the chamfering-tools. The blade $r^2$ has two cutting-edges, and a straight shank to be inserted into the handle, but its cutting-edges are below the upper surface of the handle, as represented at $r^2$, Fig. 9, so as to be in a proper position for performing the required operation of howeling the barrel without the necessity of changing the apparatus *s t* for holding and gaging the tool, as described.

The crozing-tool V, for cutting the croze, is formed in the usual manner, except in the construction of the stock $w^3$, which should be so made that the face-plate can be changed from one side to the other, in order that it may work at either end of the barrel. For this purpose the stock is made alike on both faces, as represented at $w^3$, Fig. 3, having dovetailed grooves *u′* cut into it to admit corresponding dovetailed ribs *u*, formed on the face-plate *w*, by which construction the crozing-tool can be applied at either end of the barrel by simply turning the stock on the face-plate.

Having thus described my invention so far as I propose to secure it by this division of my patent, what I now claim as new is—

1. The combination of the slide-rest *k*, guided in the manner set forth, with the tool L for turning off the cask, constructed and arranged in the manner set forth.

2. The combination of the cylinder E, open at both ends, so that both ends of the cask may be worked off without changing, with the ring-chucks O for fastening the cask into the cylinder, and with the tools herein described for chamfering and howeling.

3. The crozing-tool V, with the changeable face-plate $w$, as herein set forth.

4. The combination of the stock $l$, cutter $l'$, made adjustable, and gage-plate $l^2$, constituting the tool for turning and smoothing the outside of the cask, as above described and represented.

5. The peculiar construction of the tool for howeling the cask, substantially as described.

6. The peculiar construction of the tool for chamfering the end of the barrel, as above described.

In testimony whereof I have hereunto subscribed my name.

WILLIAM TRAPP.

In presence of—
WM. H. SPAULDING,
ALBERT STONE,
D. R. LEWIS.